Figure 1:
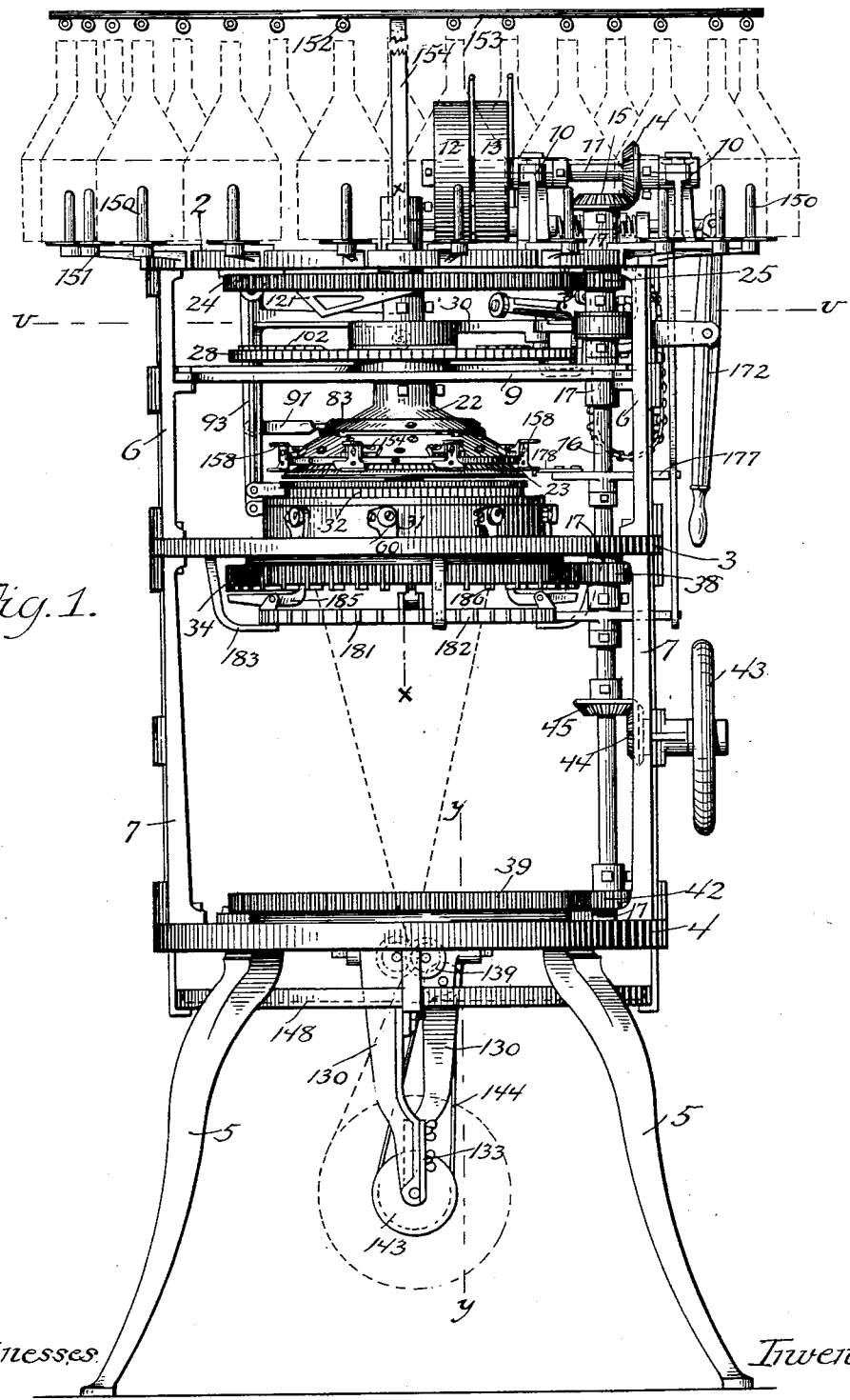

(No Model.) 10 Sheets—Sheet 2.

G. D. MUNSING.
KNITTING MACHINE.

No. 586,315. Patented July 13, 1897.

Witnesses
Inventor
George D Munsing.
By Paul Hawley attys.

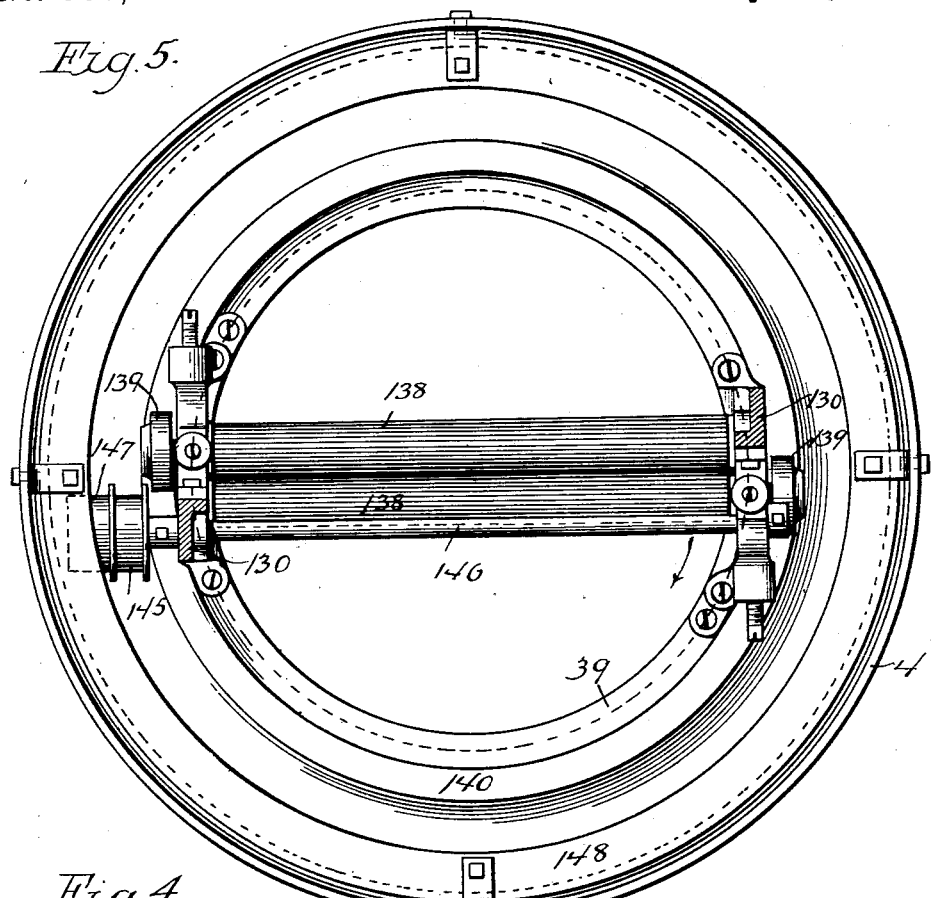

(No Model.) 10 Sheets—Sheet 4.

G. D. MUNSING.
KNITTING MACHINE.

No. 586,315. Patented July 13, 1897.

Witnesses:
J. Jensen
Fred S. Lyon

Inventor:
George D. Munsing
By Paul H. Hawley, Attys.

THE NORRIS PETERS CO., PHOTO-LITHO., WASHINGTON, D. C.

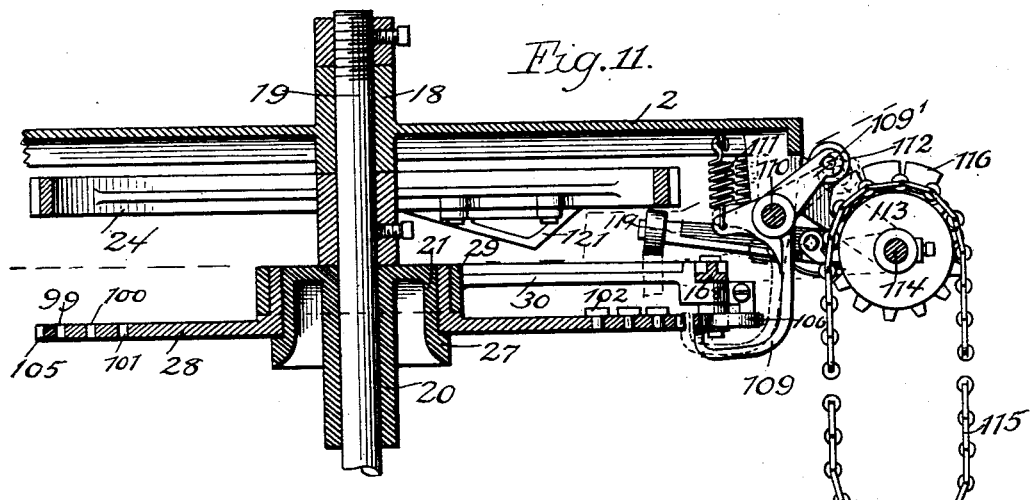

(No Model.) 10 Sheets—Sheet 6.
G. D. MUNSING.
KNITTING MACHINE.
No. 586,315. Patented July 13, 1897.
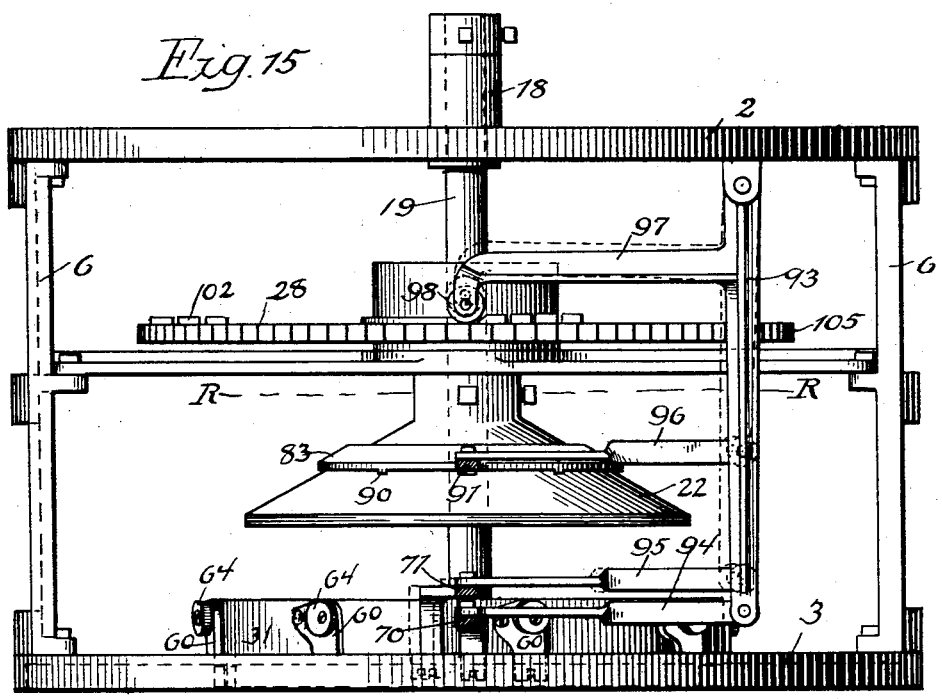
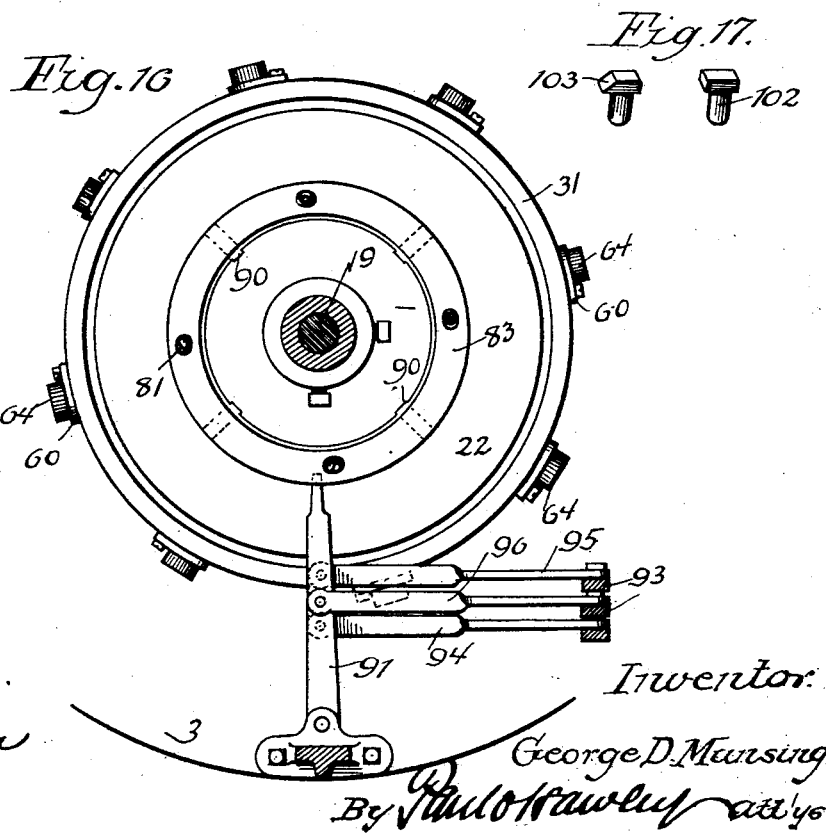
Witnesses.
J. Jensen
Inventor:
George D. Munsing.
By Paul O. Hawley att'ys.

(No Model.) 10 Sheets—Sheet 7.
G. D. MUNSING.
KNITTING MACHINE.
No. 586,315. Patented July 13, 1897.
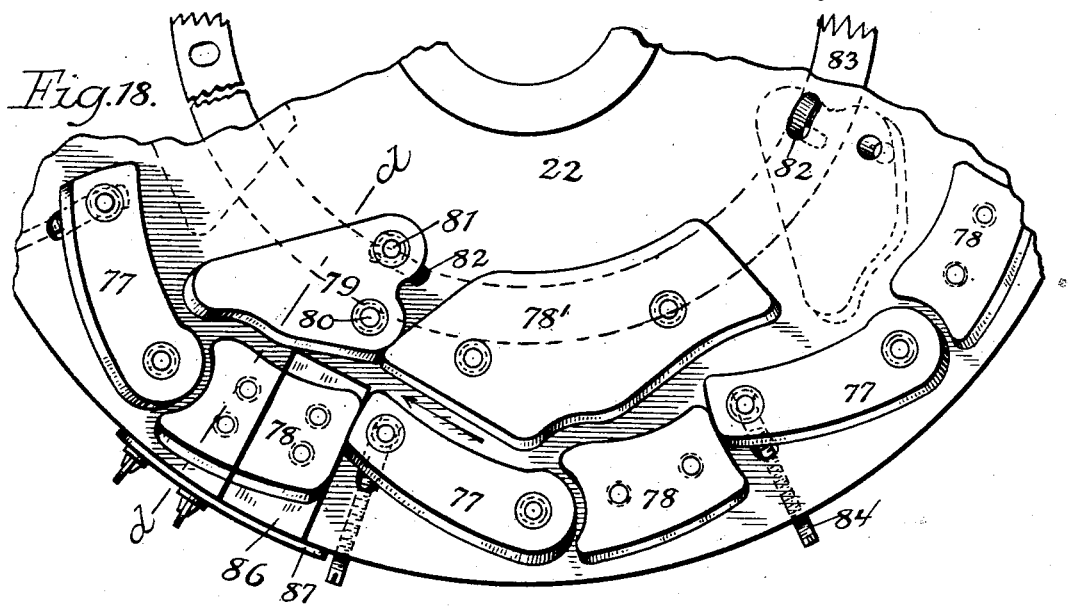
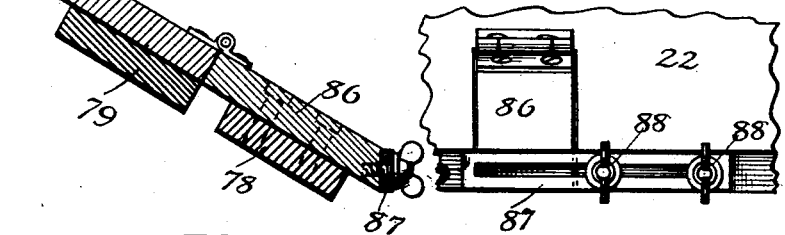
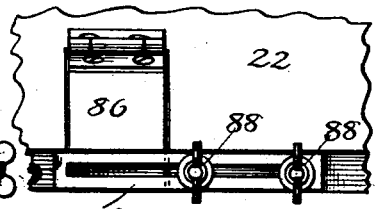
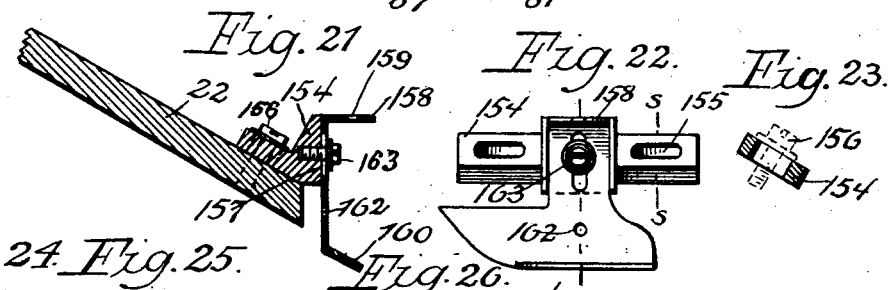
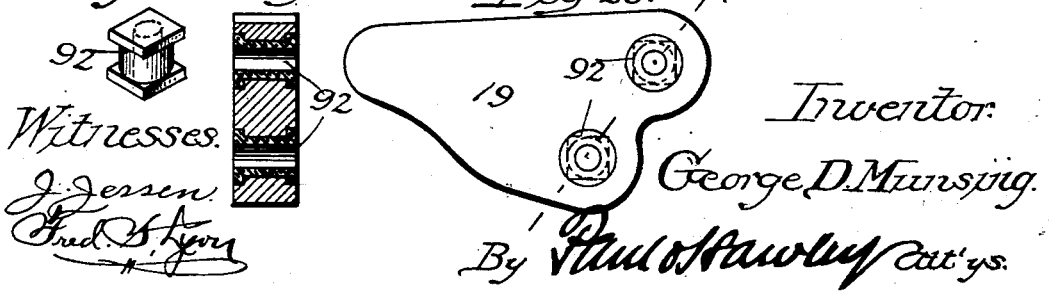
Witnesses.
J. Jessen
Fred S. Lyon
Inventor:
George D. Munsing.
By Paul S. Hawley Att'ys.

(No Model.) 10 Sheets—Sheet 8.

G. D. MUNSING.
KNITTING MACHINE.

No. 586,315. Patented July 13, 1897.

Witnesses
J. Jessen
Fred L. Lyon

Inventor
George D. Munsing
By Paul D. Rawley
his attorneys

THE NORRIS PETERS CO., PHOTO-LITHO., WASHINGTON, D. C.

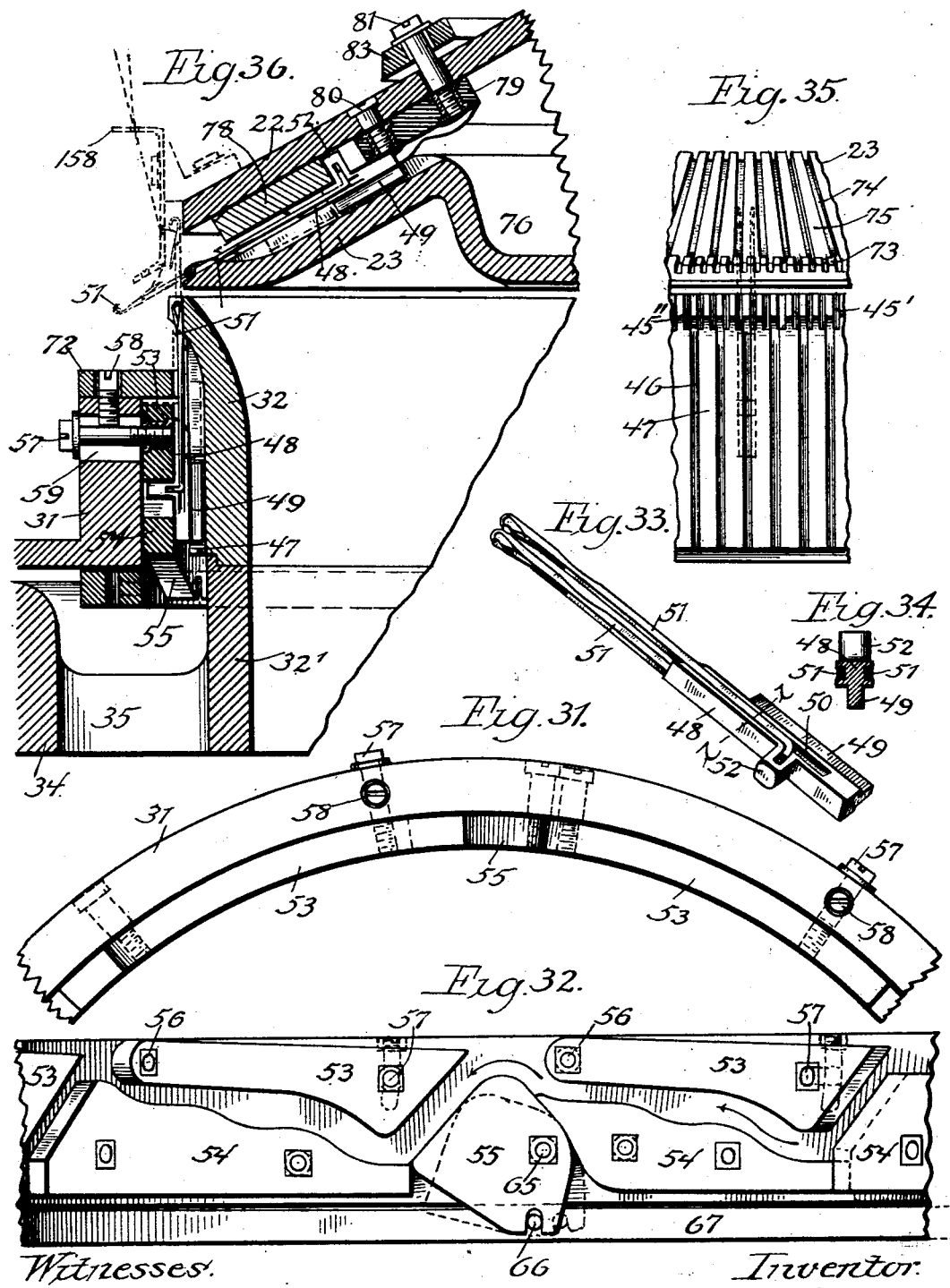

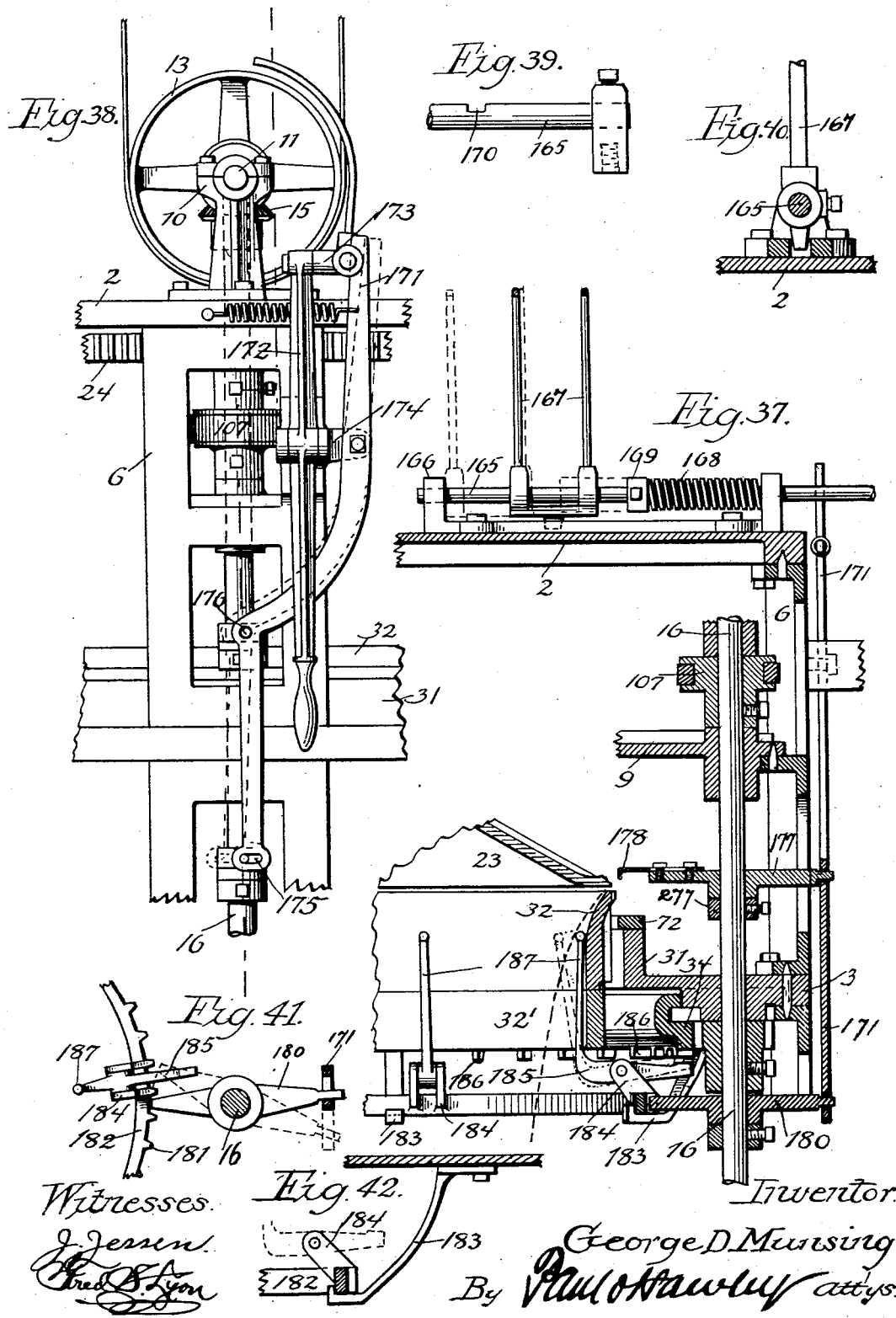

UNITED STATES PATENT OFFICE.

GEORGE D. MUNSING, OF MINNEAPOLIS, MINNESOTA, ASSIGNOR OF ONE-HALF TO HENRY A. MUNSING, OF SAME PLACE.

KNITTING-MACHINE.

SPECIFICATION forming part of Letters Patent No. 586,315, dated July 13, 1897.

Application filed August 16, 1894. Serial No. 520,539. (No model.)

*To all whom it may concern:*

Be it known that I, GEORGE D. MUNSING, of the city of Minneapolis, county of Hennepin, State of Minnesota, have invented certain new and useful Improvements in Knitting-Machines, of which the following is a specification.

The objects of this invention are, first, to provide an improved knitting-machine in which the cylinder, dial, and take-up mechanism are driven independently of each other; second, to provide a take-up mechanism which exerts a uniform tension on the fabric at all times and is adjustable and does away with the usual ratchet and pawl, or indirect friction device, operated by cams which produce an uneven tension and hence cause the fabric to be uneven; third, to provide a machine wherein the cylinder and dial are independently and separately supported and driven, by which means the usual lugs upon the two parts for driving the dial are dispensed with, the result being a much more even and more regular fabric; fourth, to provide a conical-shaped dial having the needles working on its conical surface, thus causing the latches of the needles to be pointed slightly downward, so that as the needles are drawn back they will cast or relieve the stitching more readily and with less tension, therefore producing a more perfect fabric and permitting the machine to be run at a higher speed; fifth, to produce an improved construction of needle which makes it possible to increase the lands or distances between the grooves in the needle-plates, whereby the lands are strengthened and are not liable to breakage; sixth, to provide a continuous open space below all grooves in the cylinder-plate and an annular receptacle beyond the groove or near the center of the dial-plate, into which any debris collecting in the grooves is discharged, thus overcoming the collection of the debris in the grooves, which under the ordinary construction is liable to occur, causing breakage of needles and damage to the machine; seventh, to provide an improved and cheaper construction for the needle-actuating cams; eighth, to provide a simple means for automatically moving and setting the movable cams when changing the pattern of fabric or adjusting the length of stitch, also doing away with a plurality of changes in levers and providing a more convenient means for adjusting the machine to make particular kinds of stitches, and also providing a cheaper and more convenient construction for the regulating pattern-chain; ninth, to provide an automatic stop mechanism whereby the machine is automatically stopped in case any one of the threads breaks or any imperfection appears in the fabric; tenth, to arrange the driving mechanism in a position where it is out of the way and occasions less danger to the operators and takes up a minimum space; eleventh, to produce an improved means for supporting the spools of yarn; twelfth, to provide a machine that will produce a variety of stitches and different patterns of fabric automatically at a higher rate of speed and a better and more desirable fabric than is done with the machines that are in ordinary use.

To these ends the invention consists generally in the constructions and combinations hereinafter described, and particularly pointed out in the claims, and will be more readily understood by reference to the accompanying drawings, forming part of this specification, in which—

Figure 2:
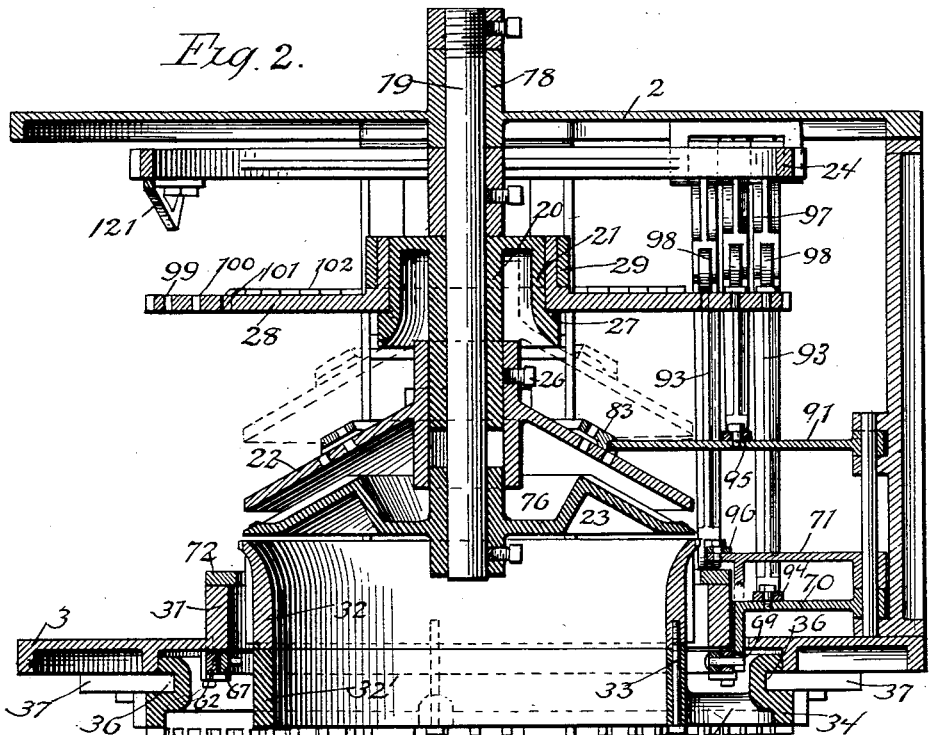
Figure 3:
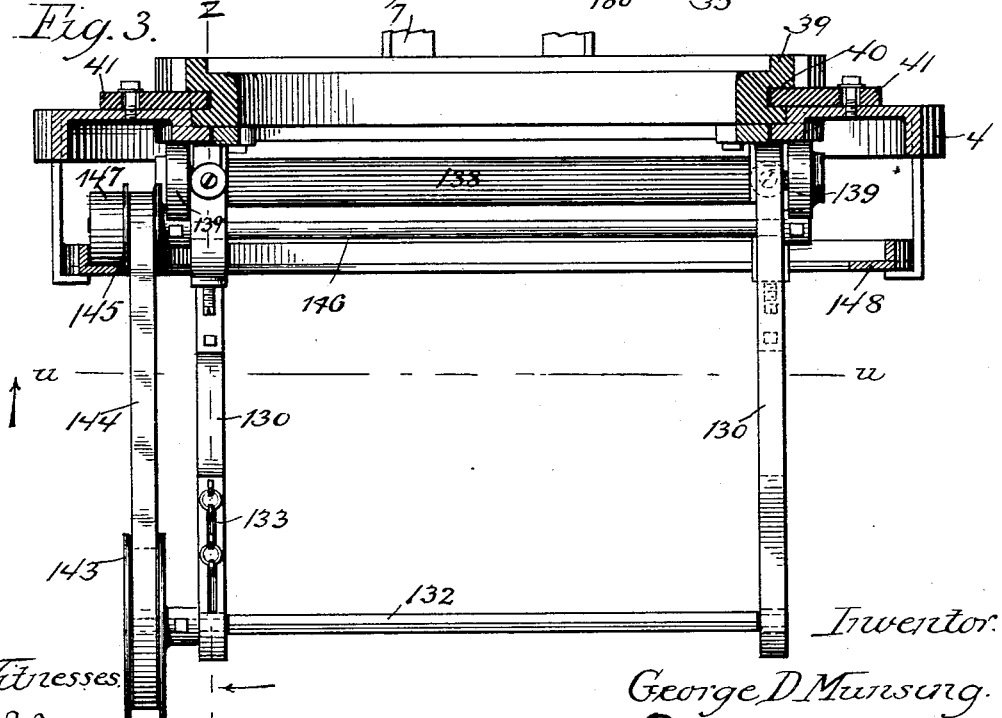
Figure 8:
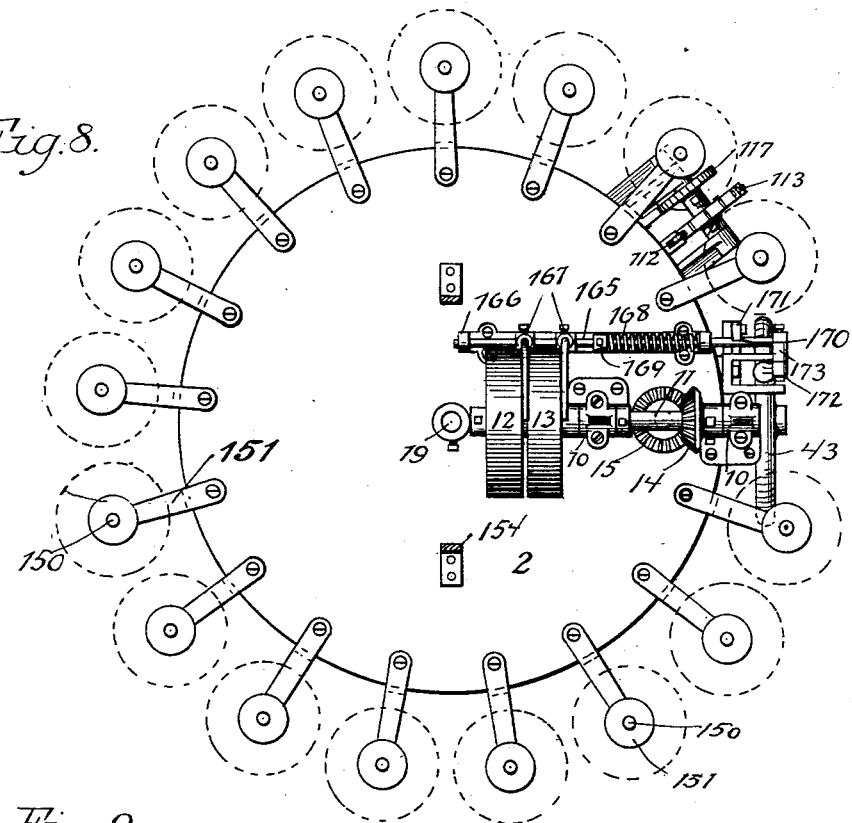
Figure 9:
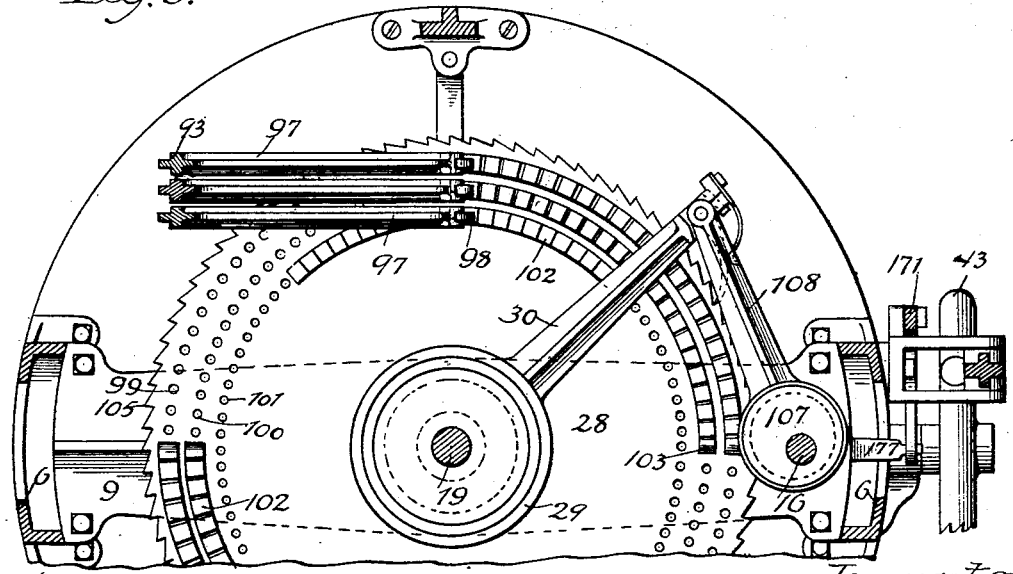
Figure 27:
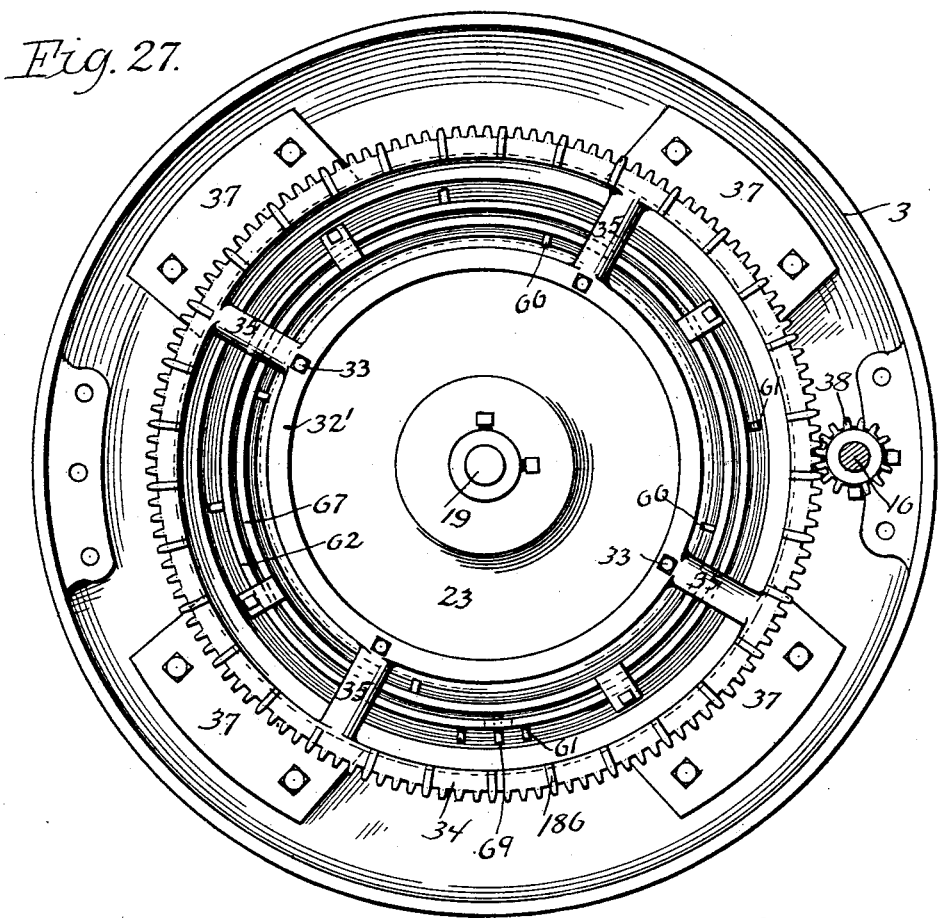
Figures 28, 30:
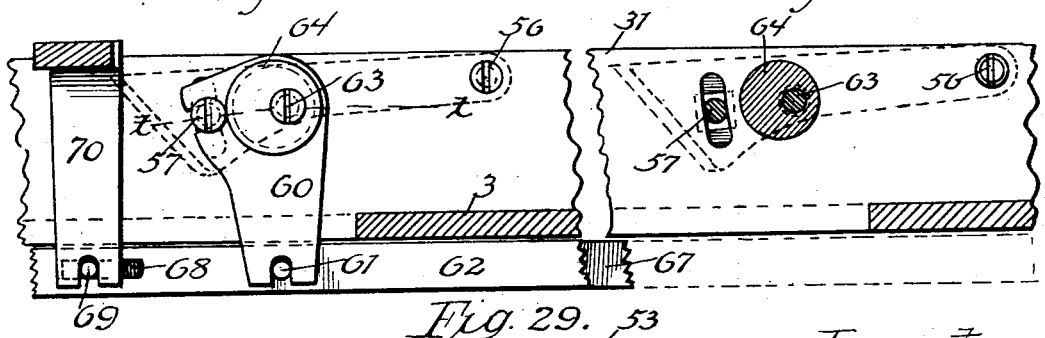
Figure 29:
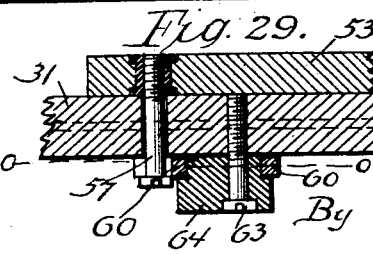

Figure 1 is a side elevation of a machine constructed in accordance with my invention. Fig. 2 is a partial section showing particularly the construction and arrangement of the cylinder and dial and means for independently driving the same, together with the pattern mechanism, the section being taken on the line *x x* of Fig. 1, all of the needles, needle-guides, and cams being omitted. Fig. 3 is a partial elevation in section, showing the means for winding up the fabric as seen from section-line *y y* of Fig. 1. Fig. 4 is vertical cross-section on the line *z z* of Fig. 3, viewed in the direction of the arrow. Fig. 5 is a plan view from beneath as from the line *u u* of Fig. 3 and showing the take-up rolls and the frictional means for driving the same. Fig. 6 is a perspective view showing one of the take-up rolls, which rolls are finely corrugated. Fig. 7 is a similar perspective view of the winding-shaft for the fabric. Fig. 8 is a view of the top of the machine, the yarn-guide only being omitted. Fig. 9 is an enlarged horizontal section on the line *u u* of Fig. 1, showing the detail construction of the pattern-wheel and the parts connected therewith. Fig. 10 is a partial horizontal section on the same line, but showing different parts—namely, the means for withdrawing the pattern-wheel-actuating pawl. Fig. 11 is a vertical section on the line *w w* of Fig. 10. Fig. 12 is a similar section showing only the cam-wheel and the means connected therewith for operating the pattern-chain carrier. Fig. 13 is an enlarged sectional detail of the part of the pattern-chain showing two pattern-blocks provided thereon. Fig. 14 is a cross-section showing means for attaching the pattern-block to the chain. Fig. 15 is a side view of connected portions of the upper part of the machine, including the cam-carrying parts and the pattern-wheel. Fig. 16 is a plan view thereof on the line R R of Fig. 15, showing means for operating the stitch-changing and the stitch-drawing cams. Fig. 17 shows two of the blocks for use upon the pattern-wheel. Fig. 18 is a partial plan view from beneath of the cam-carrying cone which is arranged over the cylinder-dial. Figs. 19 and 20 are respectively cross-section and front view of the carrying-cone, showing the small door therein which may be opened to permit the removal of the needles. Figs. 21 and 22 are respectively sectional and front views of one of the thread-carriers, several of which are provided upon the carrying-cones. Fig. 23 is a section on the line *s s* of Fig. 22. Figs. 24, 25, and 26 are detail views showing the construction of one of the cams. Fig. 27 is an enlarged plan view from beneath the cylinder. Fig. 28 is an enlarged detail view showing the cam device for operating one of the stitch-drawing cams. Fig. 29 is a sectional view thereof on the line *t t* of Fig. 28. Fig. 30 is a vertical section on the line *o o* of Fig. 29. Fig. 31 is an enlarged detail view showing the upper edge of the cylinder-cam carrier or rings with the cams thereon. Fig. 32 is an inside view thereof. Fig. 33 is an enlarged detail perspective view of a pair of needles arranged on a single shank or block. Fig. 34 is a section on the line *l l* through the cam-lug of the needle-shank. Fig. 35 shows portions of the side and top and the cylinder and the dial provided with grooves for needles and for the blocks or shanks thereof. Fig. 36 is an enlarged cross-section on the line *x x* of Fig. 1, showing the relative positions of the cylinder, the dial, the cam-carrying parts, and the needles. Fig. 37 is a detailed view in cross-section, showing the delicate stop-motion which I employ. Fig. 38 is a side view thereof. Figs. 39 and 40 are plan and sectional views of the shipper-rod. Fig. 41 is a detail plan view of the stop-motion. Fig. 42 is a vertical sectional detail showing the means for supporting the finger-carrying ring.

As shown in Fig. 1, the machine-frame is made up of the top disk or plate 2, the intermediate ring or bed 3, and the bottom ring or bed 4, the latter being supported upon several legs 5. The parts 2 and 3 are separated by the standards 6, and these parts are supported upon the lower ring by suitable standards 7. The middle parts of the standards 6 are connected by the arm 9.

Referring to Figs. 1 and 8, it will be seen that small blocks and bearings 10 are provided upon the top plate adapted to receive the transverse shaft 11, upon the inner end of which I provide a fixed pulley 12 and a loose pulley 13. On the shaft 11 is a bevel gear-wheel 14, meshing with the horizontal bevel-gear 15 upon the upper end of the upright shaft 16, which shaft extends down to the standards and close thereto, having bearings 17 in the plates 2, 9, 3, and 4. The longitudinal movement of the shaft 16 is prevented by suitably-arranged collars, and from this shaft the several horizontally-revoluble parts are driven.

Referring to the other figures of the drawings, 18 represents a central box provided in the upper casting and adapted to receive the vertical central shaft 19, held up by the collar 18', which shaft also has a long bearing in the sleeve 20 on the cross-plate arm 9. Outside of this sleeve is another sleeve 21, formed integrally therewith, a space being left between them so that a cam-carrying cone 22 may be raised, as shown in dotted lines in Fig. 2. The lower end of the shaft 19 closely approaches the plane of the middle ring 3 and carries the conical dial 23. The shaft 19 is driven by means of the large gear-wheel 24, which meshes with the pinion 25, provided upon the shaft 16. The cam-carrier 22 is held stationary on the arm 9, being fixed to the sleeve 20 by a set-screw 26. The exterior of the sleeve 21 is provided with the shoulder 27 and serves as a central bearing or shaft for the pattern-wheel 28, having a central boss to lengthen its bearing. This boss entirely serves as a bearing or shaft for the inner end 29 of the arm 30, driven by an eccentric.

The needle-cylinder and the parts operating in connection therewith are entirely independent of the dial and its parts. The ring 3 is provided with a cam-carrying ring 31, the inner diameter of which is somewhat greater than the outside diameter of the needle-cylinder 32. The cylinder is made in two parts 32 and 32', as shown, the former being centered upon the lower part and secured thereto by bolts 33. (See Fig. 2.) The lower part really forms the hub of the large gear-wheel 34, being connected to the outside thereof by the short spokes 35. These spokes are preferably of less than half the thickness or face measure of the gear-wheel, and the part 32' and the upper side of the spokes are preferably rounded, so that dust and lint will not collect thereon. By lowering the spokes in this way they are removed from contact with the needles, and broken needles and debris may be removed from the bottom. The gear-wheel has in its face an annular groove 36 and revolves upon several tongues 37, which project from the under side of the ring into said annular groove. The lower part of the face only is provided with gear-teeth, and these, as shown in Fig. 1, mesh with the pinion 38, provided on the vertical shaft 16.

The remaining main part of the machine consists in the take-up mechanism, made up of the gear-ring 39, having an annular groove 40, into which the tongue 41 projects from the ring or base 4, the ring revolving on said tongue. This ring carries the take-up mechanism and is driven by a pinion 42 upon the vertical shaft 16. The gears 39, 34, and 24 are all of the same diameter, and the pinions 25, 38, and 42 are of the same size, so that the dial, the cylinder, and the take-up revolve at the same speed. As a convenience for starting or slowly operating the machine I provide the hand-wheel 43, fixed on a short shaft having bearings in the standards 7 and carrying the bevel-gear 44. This bevel-gear engages the second gear 45, provided on the shaft 16. The cylinder 32, which is carried upon the wheel 34, is adapted to carry a large number of needles. On the outside and at the upper edge of the cylinder is a small flange in which are the vertical slots 45″ (see Figs. 35 and 36) to receive the upper ends of the needles. The lands between the slots are of substantially the same width as the slots. Beneath the flange the outside of the cylinder is cut away slightly and the lower part is provided with the long vertical slots 46, of which there are half as many as there are slots 45″, so that the lands 47 are much wider and stronger than usual. In order to gain this advantage, it is necessary to arrange the needles in sets of two or more, secured upon small sliding jacks 48. (See Figs. 33 and 34.) On the back of each block is a feather or wing 49, adapted to slide in its groove 46. In the sides of the block in suitable grooves 50 the needles 51 are placed, and from the opposite side or front of the shank or block the heel 52 extends into the cam-groove of the ring or flange 31. The upper edge of the cylinder is made as thin as possible by belling out the same, the inner surface being made smooth to prevent abrasion of the fabric which passes down within the cylinder.

For a simple machine to be used for one kind of work only and without means for taking up wear a simple undulating groove might be provided on the inside of the cam-ring 31, but for general purposes for which the machine may be employed it is necessary to outline the groove by a series of stationary and adjustable cams. For this purpose I employ a number of curved cams fitting the inside of the ring 31, as shown in Figs. 31, 32, and 36, wherein 53 53 represent adjustable stitch-drawing cams, one being provided for each thread or thread-holder for the machine. 54 54 represent stationary forcing-cams, and 55 represents one of the stitch-changing cams, the same being adjustable. There are half as many stitch-changing cams as there are thread-carriers. The drawing-cams 53 are pivoted by bolts 56 and are made adjustable by the use of the two set-screws 57 and 58. The set-screw 57 extends through a slot 59 in the ring 31 and its threaded end is secured to the end of the cam. The screw 58 simply prevents the other screw from rising after it is once adjusted. In place of providing for this permanent adjustment I may employ the shifting and locking means shown in Figs. 1, 2, 28, 29, and 30. The screws 57 are then engaged by the bell-crank 60, the lower end of which engages a pin 61 upon a revoluble ring or shifter 62. The bell-crank is fitted upon a fixed pin or screw 63, and to provide for quick adjustment and one that shall be independent of the shifter-ring I may employ the adjustable, but normally fixed, cam 64, upon which the bell-crank is journaled, and which cam may be secured by the set-screw 63. This cam also serves as a means for locking the bell-cranks 60. Each of the drawing-cams, of which in the machine there are a series of eight, is thus connected to the shifting-ring 62. The means for adjusting the stitch-changing cams, of which there are four for the cylinder, are substantially the same, said cams 55 being pivoted on studs or pins 65 and having their lower ends in engagement with pins 66, provided upon a shifting-ring 67. As this ring 67 is within the other shifter-ring a slot 68 is provided in the latter and a pin or stud 69 extends through the same from the ring 67, being there in position to be engaged by the shifter-arm 70. The ring 62 is provided with a pin or lug to be engaged by the shifter-arm 71. These shifter-arms (see Fig. 2) are both pivoted on the frame and are arranged to be operated from the pattern-wheel. The cams upon the inside of the ring are preferably concealed by a small ring or cap 72, secured upon the top of the ring or flange 31.

The top of the dial is provided with a narrow row of lands 73 (see Fig. 35) at its lower edge similar to those upon the upper edge of the cylinder and having the upper needles, the groove 74, and wide lands 75 between them, corresponding to the groove 46 and the lands 47 of the cylinder and of the same size, with the exception that the lands 75 taper toward the top, as is made necessary by the decreased size of the cone at that point. The cone, instead of being extended upward to its apex, is depressed at the middle to form the basin or receptacle 76, adapted to receive all debris working back of the needles. The needles for the dial are of the same construction, mounted upon similar jacks, and of the same length as those of the cylinder, so that the dial and cylinder-needles are interchangeable, an obvious advantage. The cams, which correspond in a great measure to those for the cylinder, are secured upon the under side of the cone 22, which cone is stationary, as before stated. Around the lower edge of the cone the drawing-cams are arranged. (See Fig. 18.) There are eight of these drawing-cams 77, corresponding to the drawing-ing-cams of the cylinder, except that the cams are shorter, and between them I provide retaining plates or cams 78, which are used simply to prevent the needles from dropping out.

Opposite the drawing-cams are four stationary forcing-cams 78', and between these I provide the adjustable forcing or stitch-changing cams 79, pivoted by the bolts 80 and adjustable by means of the bolts 81 81, extending through slots 82 in the cone, the pins there taking hold of the shifting ring 83, provided on the top of the cone. The drawing-cams 77 are also made adjustable, but as they are seldom changed in position the adjusting means consists in simple set-screws 84, extending into slots in the cone and into engagement with pins extending into said slots from the free ends of the drawing-cams. Locking means may also be provided similar to the means for locking the cams 53. In order that the needles may be withdrawn from the space between the dial and the cone, I preferably provide a small swinging door 86 in the cone, the stationary cam 78 being cut and a part thereof being carried by the door. The door-opening extends back into the grooves between the several cams, and the door is fastened in place by a small slide 87, fastened upon the edge of the cone and secured by the thumb screws or nuts 88, the shanks of which extend through the slot in the slide. Its fastening is firm, as the lower edge of the door is at an obtuse angle to the top thereof. The shifting ring 83 preferably has several small lugs 90, which alone bear on the top of the cone and decrease the friction therewith. For moving the shifting ring I provide the pivoted shifter-arm 91, similar to the arms 70 and 71 and also operated from the pattern-wheel.

The cams which I employ for both the dial and the cylinder parts are of peculiar construction, inasmuch as the main body of each cam is formed of hardened cast-iron, while in order to make the cost of the cams as light as possible small soft-iron plugs 92 are cast therein in suitable positions, which are afterward bored to receive the pins or screws. To prevent the plugs from slipping out, they preferably have the flanged form. (Best shown in Figs. 24 and 25.) The chilled or hardened iron may be very easily ground upon an emery-wheel, but it would be quite impossible to drill the holes through the same at anything like a moderate cost. The cam-surfaces may be made as smooth as required. The finished cam will possess as many advantages in strength, form, and durability as the more expensive steel cams which are ordinarily employed. As before stated, the shifting rings and the several movable cams are operated from the pattern-wheel, this by means of the separate levers 93, the upper ends of which are pivoted upon the plate 2, (see Figs. 2 and 15,) while the lower ends are connected with their respective arms 70, 71, and 91 by pivoted links 94, 95, and 96, respectively. From each lever 93, which levers are placed in a row preferably, a horizontal arm 97 extends over the top of the pattern-wheel 28, and its outer end is provided with a small roller 98. These rollers obviously occupy different positions upon the wheel with respect to distance from the center thereof. The pattern-wheel is provided with a series of holes 99, 100, and 101, (see Figs. 2 and 9,) arranged in circles and in the path of the respective pulleys or rollers 98. When one or more of the small headed pins 102 are placed in these holes, it is obvious that as the heads project above the surface of the pattern-wheel the pulleys or rollers will be raised as the heads pass beneath them and each time a pulley is raised the lever 95, belonging thereto will be operated, thus operating the cams connected therewith and changing the stitch in some respects. As the pins 102 are ordinarily arranged in circular rows or portions of a circle I preferably make a first pin for each set of holes, providing the same with an inclined front end 103. (See Fig. 17.) It is obvious that if the pattern-wheel were allowed to revolve at the same speed with the dial and cylinder and to carry a number of raising-blocks 102 the pattern of the fabric would be changed periodically. Inasmuch as it is often desirable to form long pieces of fabric of the same stitch throughout, it is necessary to provide means for driving the pattern-wheels, and that said means should be under easy control, and that the pattern-wheel may be stopped and started in accordance with the ultimate design of the long piece of fabric. I therefore provide a ratchet-and-pawl mechanism for moving the pattern-wheel, the periphery of the ratchet-wheel being provided with ratchet-teeth 105 to be engaged by a spring-pawl 106. (See Figs. 9, 10, and 11.) This pawl is pivoted upon the swinging arm 30 and the arm is operated at a continuous speed by means of the eccentric 107, secured upon the shaft 16 and from the strap of which an arm or rod 108 extends to the end of the swinging arm 30. If the eccentric and pawl were allowed to operate continuously, however, the pattern-wheel would be revolved at a speed much too rapid to effect the proper controlling of the cam mechanism, and therefore to control the pattern it is necessary to provide means for disengaging the pawl while permitting the eccentric to operate steadily. For this means I provide the arm or swinging detent 109, the point of which is adapted to enter behind the pawl, and withdraw the same from the pattern-wheel. This arm or detent is pivoted upon a short shaft 110 and is normally held up by a spring 111, and when in said position does not engage with the pawl. The arm extends on the other side of the shaft, bearing in the part 109', the small pulley or roller 112 adapted to be raised by the revolving or traveling pattern-regulator. (Shown in Figs. 10, 11, 13, and 14.) When so raised, the detent is drawn back to withdraw the pawl. The pattern-regulator consists in a sprocket-wheel 113, secured upon a shaft 114, which has bearings in the arms extending from the top of the frame. The sprocket-chain 115 is of a length in proportion to that of a complete garment, and upon the chain at given points and in given numbers I provide small blocks 116, which, arriving at the top of the sprocket, serve to raise and hold up the detent-arm. In this way I obtain a cam of exceedingly long face or periphery. The short shaft is slowly revolved by means of the ratchet-wheel 117, fixed on the shaft, and itself operated by the ratchet-pawl 118, provided on the vertical swinging arm or lever 119. The arm is normally held up by the spring 120 and is depressed by the depending cam 121, provided on the lower side of the gear-wheel 24. Each revolution of the dial-shaft, therefore, causes the short shaft to revolve slightly, carrying the sprocket-chain and the block forward. As these blocks and the number of the same must be altered for each kind of garment to be made upon the machine, I preferably construct the same so that they may be removed from the chain. The blocks are made from sheet metal pressed into the form shown in Figs. 13 and 14, being provided with the spring flanges or ends 123, adapted to engage the end of the forward link and the sides of the next link, respectively, or the links may be removed with the block, which in such case would be made solid.

From the above it is obvious that the pattern-wheel will be revolved only at the times of disengagement between the detent and the regulating-chain, and, further, that this portion of the mechanism controls the continuance and also the length of a particular kind of fabric and stitch only, and that the particular stitch specifically considered is controlled from the pattern-wheel itself by the engagement of one or more of the lever-arms 97 with the raised parts upon the pattern-wheel. For instance, plain or derby stitch would be made by the use of a regular chain 115, all links of which would be filled with blocks and the use of the pattern-wheel alone without the pins 102. With the same regulator-chain long strips or pieces of either half or full cardigan fabric could be made by the employment of pins or blocks upon the pattern-wheel.

For half-cardigan the middle row of holes upon the pattern-wheel would all be filled with pins or blocks, while for full cardigan the middle and the outside rows would be completely filled, so that the stitch-changing cams of both the dial and the cylinder would in the latter case be thrown down or away from the adjacent edges of the dial and cylinder. To produce a variegated fabric, the number of pins in the several pattern-wheel holes and the length of the rows of the same would be adjusted, and the number of blocks upon the regulator-chain and the positions of the groups of blocks thereon so ordered as to bring about the desired result. The block-bearing links are placed bodily in the chains in the number needed.

The take-up mechanism consists in the ring 39, as before stated, from which the arms 130 depend. (See Fig. 4.) In the lower ends of these arms I provide the sockets 131 for the ends of the square winding-shaft 132, which shaft is removable therefrom by raising the latches 133. The latches are secured by thumb-screws, as shown. The sockets are in the form of slots, which permit a considerable rise and fall of the shaft and the roll of fabric thereon. In the upper end of each arm I provide a stationary socket or bearing 134 and a square bearing-block 135. The square or spring bearing-blocks are held up by the vertical and lateral springs 136 and 137, and in these bearings I arrange the shafts of the two corrugated take-up rolls 138. One end of each shaft is secured in a stationary bearing, while the opposite end is arranged in a spring-bearing, and on this end I provide a friction-pulley 139, which, owing to the use of the spring 136, is pressed up against the circular track 140 on the under side of the ring or base 4. The arrangement is such that the revolution of the arms and the ends of the rolls causes the rolls to be pressed firmly together. The winding-shaft is provided with a large pulley 143, from which a belt 144 extends to a smaller pulley 145, provided upon a shaft 146, having suitable bearings in the opposite arms and having on one end a friction-pulley 147, adapted to run upon the lower track or ring 148. The bearing for the pulley end of the shaft 146 is preferably in the form of a slot to allow slight vertical movement of said shaft. It will therefore be seen that the weight of the roll of fabric will be exerted to draw down the friction-pulley and strengthen the engagement between the same and the track 148. In this manner the take-up rolls are relieved from the weight of the roll of fabric, and, further, the size of the roll will have no effect upon the operation of the take-up rolls, the necessary power required to turn the larger roll of fabric being compensated for by less slippage of the friction-pulley 147 upon its track.

The thread holding and carrying devices are very simple in their construction. The bobbins of thread are held upon the spool-studs 150, provided upon the arms 151, which extend from the top plate 2. From the bobbins or spools the threads extend through small eyes or carriers 152, provided upon the ring or disk 153, supported by the central standard 154, which is secured upon the top 2. From thence the thread is carried down to the carriers upon the stationary cone 22. One of these carriers is shown in detail in Figs. 21, 22, and 23. A small bracket 154 is provided with the large holes or slots 155 and is secured upon the lower edge of the cone 22 by means of set-screws 156. The bracket has a vertical face 157, and to this the thread-carrier proper is fastened. The thread-carrier is made of sheet metal, the upper end being bent outwardly to form the lip 158, provided with the hole 159, through which the thread is carried. The lower edge of the piece is turned up at an angle to form a longer extension 160, and one hole 162 is provided in the vertical part of the carrier. The two threads which run to each carrier pass through this hole. The forward end of the carrier is preferably extended outward in the usual form, being curved upwardly in shoe form to press down any parts of the fabric which may rise above the needles. The carrier is made adjustable by means of a slot in the upper part thereof and a set-screw 163, whereby the carriage is fastened to the bracket. There are eight of these carriers upon the machine illustrated.

The delicate stop-motion which I employ is entirely mechanical and is best shown in Figs. 1, 8, and 27, and Figs. 37 to 42. As there shown, 165 represents a shifter-rod adapted to slide in the bearing 166 and upon its inner end carrying the two fingers 167, which embrace the belt and move the same from one pulley to the other. The tendency is to throw the belt upon the loose pulley, this being accomplished by the strong coiled spring 168, provided about the shifter-rod and acting against a collar 169 thereon. The outer end of the shifter-rod is provided with a small notch 170, with which the locking-lever 171 is adapted to engage to hold back the shifter-rod, so that the belt may run upon the fixed pulley to drive the machine. For shifting the belt from the loose to the fixed pulley I provide the hand-lever 172, pivoted on the side of the frame and connected to the shifter-rod by means of the link 173. The lever 171 is pivoted on the lug 174, formed on the upper part of the frame, and the lower end thereof is provided with the slot 175, while the intermediate part has the hole 176. The latter accommodates the pin on the end of the short swinging arm or lever 177, which for convenience is pivoted on the vertical shaft 16, being supported thereon by a collar 277, as shown in Fig. 37. From the inner end of this arm a small finger 178 extends into position to be struck by a bunch of thread or lint collecting upon the needles and which would be apt to prevent the drawing down of the fabric, and consequently cause the same to be torn. This finger is preferably adjustable on the arm.

It is obvious that when the finger is operated in the manner described the lower end of the lever or pawl 171 will be thrown forward, thereby disengaging its upper end from the shifter-rod, upon which the shifter-rod will be thrown back by the spring. A similar device is provided at the lower end, consisting in a second swinging arm 180, also pivoted on the shaft 16, and the inner end of which extends into position to be engaged by the teeth 181 upon a normally stationary ring 182. This ring is supported upon the arms 183, which extend down from the middle plate of the frame. The ring is provided with the lugs 184, whereon are pivoted the small bell-cranks 185, the outer ends of which are adapted to swing up into engagement with teeth 186, provided upon the under side of the cylinder gear-wheel. This takes place when the fabric, which is normally drawn taut through the cylinder, slackens therein to permit the small vertical fingers or arms 187 of the bell-crank 185 to fall inwardly. The same will take place when the finger drops through a hole in the fabric. Immediately upon any one of the several bell-cranks dropping down into the position shown by dotted lines in Fig. 37 the outer arm thereof will move into engagement with the teeth on the under side of the gear-wheel, whereupon the ring 182 will be moved forward with said gear, the result being that the inner end of the arm 180 will be struck by a tooth on the ring 182, moving said arm, as shown by dotted lines in Fig. 41, to operate the lever 171 and disengage the shifter-arm.

Having thus described my invention, I claim as new and desire to secure by Letters Patent—

1. The combination, with the needle-cylinder provided with grooves, the needles mounted in groups upon needle-jacks, said jacks being arranged to slide in the grooves in said cylinder, the conical needle-dial provided with grooves, a second series of needles mounted upon jacks, said jacks being arranged to slide in the grooves in said dial, and means for reciprocating said jacks and said needles as said dial and cylinder are rotated, substantially as described.

2. The combination, with the needle-cylinder, of the needle-dial, the take-up mechanism, parts for supporting said cylinder, said dial and said take-up mechanism, gear-wheels in connection with each, the main shaft or spindle, pinions thereon engaging said gear-wheels respectively, means for revolving said shaft whereby said dial, cylinder and take-up mechanism are rotated independently, the belt-shaft whereto said spindle or shaft is geared, the belt-shifter and the automatic stop devices provided adjacent to said cylinder and said dial and operating upon said shifter, whereby the rotation of the cylinder, dial and take-up mechanism may be automatically stopped, substantially as described.

3. The combination, in a knitting-machine, of the cylinder and the dial and means for rotating the same, the stationary part arranged about the cylinder and the stationary part arranged above the dial, the movable drawing-cams and the stationary forcing-cams arranged upon said stationary parts to operate upon the needle carried by said cylinder and said dial, the shifting rings connected with said movable cams, the changeable-cam pattern-wheel and means for rotating the same, pivoted arms to be operated thereby and means connecting said arms and said shifting rings, respectively, whereby the positions of the cams are automatically changed to change the stitch, substantially as described.

4. The combination, in a knitting-machine, of the main frame, the needle-cylinder and the needle-dial, both revoluble therein, the stationary part arranged above the dial, the forcing and drawing cams provided thereon, some of said cams being movable and pivoted upon said stationary part, said movable cams being provided with pins to engage a shifting ring arranged upon said stationary part, the pattern-wheel, independent means for revolving the same at desired times and at a desired speed, and means in connection with said pattern-wheel for moving said shifting rings to alter the positions of said cams, substantially as described.

5. In a knitting-machine, the combination, with the needle-carrying dial and the needle-carrying cylinder, means for revolving the same, the movable needle-operating cams for both the dial and the cylinder, a pattern-wheel, arms to bear thereon, one arm being provided for one set of dial and both sets of cylinder cams and connected therewith to operate the same, and means for revolving said pattern-wheel, substantially as described.

6. In a knitting-machine, the combination, with the needle-carrying dial and the needle-carrying cylinder, means for revolving the same, the needle-operating cams for both the dial and the cylinder, a pattern-wheel, arms to bear thereon, an arm being provided for one set of dial and both sets of cylinder cams and connected therewith to operate the same, and automatically-regulable means for revolving said pattern-wheel, substantially as described.

7. In a knitting-machine, the combination, with the needle-carrying dial and the needle-carrying cylinder, means for revolving the same, the movable needle-operating cams for both the dial and the cylinder, a pattern-wheel, arms to bear thereon, an arm being provided for one set of dial and cylinder cams and connected therewith to operate the same, a pattern-chain having an adjustable irregular face, an arm to be operated thereby, means for operating said chain, means for revolving said pattern-wheel, and a shifting device connected with the pattern-chain arm to regulate the operation of said pattern-wheel, substantially as described.

8. The combination, with the movable needle-operating cams, of the dial and the cylinder of a knitting-machine, of a revoluble pattern-wheel provided with an annular row of holes, headed pins to be inserted in said holes to give the wheel an irregular or cam surface, an arm to bear upon said surface, a shifting device connected with said cams and with said arm, a ratchet device operating upon said pattern-wheel to revolve the same, and means for regulating the action of said device and thereby said wheel, and hence the needle-operating cams, substantially as described.

9. In a knitting-machine, the combination, with the movable needle-operating cams, of the shifting device in connection with the cams, a pattern-wheel, an arm to be operated by the rotation of said wheel and connected with said shifting device, a ratchet device for operating said pattern-wheel, the pattern-chain, the blocks carried thereon, the wheel whereover said chain revolves, the pivoted arm to bear against said chain to be operated by the blocks thereon, and said arm provided with an extension or finger for engaging the pawl of the ratchet device to withdraw the same from engagement with the pattern-wheel, whereby the movement of the pattern-wheel is stopped, as and for the purpose specified.

10. A needle-operating cam for knitting-machines, the same being formed of cast metal and provided with a soft-metal pin, tongues cast in the cam, substantially as described.

11. In a knitting-machine, the combination, with a needle-operating cam, of a stationary part whereon the same is pivoted, a movable but ordinarily stationary eccentric secured upon said stationary part, a bell-crank journaled thereon, one end or arm of said bell-crank being connected with the free end of said needle-operating cam, and a shifting device arranged in connection with the other end or arm of the bell-crank, substantially as described.

12. In a knitting-machine, the combination, with the middle frame, the plate or ring provided with movable tongues 37, of the gear-wheel provided with the annular channel to accommodate said tongues, whereby the gear-wheel is supported, said gear-wheel being arranged to support the needle-cylinder, substantially as described.

13. In a take-up mechanism for knitting-machines, the combination, with the frame, of a horizontally-arranged gear-wheel arranged therein, adjustable spring-bearings carried by said gear-wheel, the drawing-rolls supported in said bearings, an annular friction-surface provided upon the frame, and each of said take-up rolls being provided with a friction-wheel to engage said friction-surface, whereby as said gear-ring is revolved said rolls are rotated, the friction-wheels upon the drawing-rolls being arranged upon the opposite ends thereof, and so that as the ring and rolls are carried around the take-up rolls will be pressed together by the frictional engagement of the friction-wheels with said friction-surface.

14. The combination, in a take-up mechanism for knitting-machines, of the frame, with the gear-ring revoluble therein, the drawing-rolls carried by said ring, means for rotating the same, comprising an annular track, arms extending from said ring and a take-up roll or shaft arranged in and between the lower ends of said arms, a shaft carried on the upper parts of said arms and having a pulley, a friction-wheel arranged thereon and adapted to roll upon said track, a pulley also provided on the take-up shaft, and a belt extending over said pulleys whereby as said ring is revolved said take-up shaft is also revolved through the frictional engagement of said friction-wheel with said track, substantially as described.

15. The combination, with the ring, the frame whereon the same is revoluble, drawing-rolls carried by the ring, arms depending from said ring, a take-up shaft arranged in the lower ends of said arms and vertically movable therein, an annular track, a shaft, a friction pulley or wheel arranged on the shaft and adapted to travel upon said track, said shaft being vertically movable, the pulley arranged thereon, the pulley provided upon the take-up shaft, and a belt extending over said pulleys, substantially as and for the purpose specified.

16. The combination, in a knitting-machine, of the cylinder and the dial, the stationary parts opposite the same, the cylinder and dial cams carried thereby, a pattern-wheel provided with one or more rows of holes, the headed pins to insert in said holes, means for revolving said pattern-wheel at desired times, and desired distances, arms connected respectively with said cylinder and dial, cams to bear upon the face of said wheel and to engage headed pins arranged therein, and the vertical, pivoted levers connecting said arms with said cams, substantially as described.

17. The combination, in a knitting-machine, of the cylinder and the dial, the stationary parts opposite the same, the cams carried thereby, the horizontal pattern-wheel arranged above said cylinder and dial, and provided with one or more rows of holes, the headed pins to insert in said holes, an eccentric mechanism for rotating said pattern-wheel at desired times and desired distances, means connecting said cams and pattern-wheel, a pattern-chain, the wheel with which the same is revoluble, blocks upon said pattern-chain, an arm to be engaged by the blocks as the wheel is revolved, and means in connection with said arm for disengaging said eccentric mechanism from said pattern-wheel to permit said wheel to stop, substantially as and for the purpose set forth.

18. In a knitting-machine, the combination, with the movable needle-operating cams, of shifting means therefor, a horizontally-arranged pattern-wheel, above said cams and said shifting means, means for rotating said wheel, and a horizontal arm arranged to bear upon the face of said wheel and connected with said shifting means whereby said cams are automatically operated to change the stitch, substantially as described.

19. In a knitting-machine, the combination, with the movable operating-cam, of shifting means therefor, a horizontally-arranged pattern-wheel, a horizontal arm arranged to bear against the same and connected with said shifting means, the pattern-chain, means for revolving the same, a pivoted arm to be operated thereby, and means adapted to be regulated by the pattern-chain, for preventing the revolution of said pattern-wheel, substantially as described.

20. In a knitting-machine, the combination, with the movable needle-operating cams, of the shifting rings therefor, a horizontal pattern-wheel, the horizontal arm bearing against the upper surface of the same, the pivoted lever connecting said arm with said shifting ring, a pattern-chain, means for revolving the same, comprising a swinging arm, and a ratchet device in connection therewith for revolving said pattern-chain, an arm to be operated thereby, and the lever adapted to be regulated by the movement of the pattern-chain, for preventing the revolution of said pattern-wheel, substantially as described.

21. In a machine of the class described, the combination with the central shaft and means for operating the same, of the sleeve 20 arranged upon said shaft, the cam-carrying cone secured to the lower end of said sleeve, the second sleeve surrounding said sleeve 20 at the upper end thereof, and a space being provided between said sleeve above said cam-carrying cone, for the purpose set forth.

22. In a machine of the class described, the combination with the central shaft and means for operating the same, of the sleeve arranged upon said shaft, the pattern-wheel supported by said sleeve, the arm 30 carried by said pattern-wheel, the pawl arranged at the outer end of said arm 30 to engage teeth provided in the edge of said pattern-wheel, an eccentric supported near said pattern-wheel, means for revolving said eccentric and an arm or lever connecting said eccentric with the outer end of said arm 30, whereby said pattern-wheel may be rotated simultaneously with the rotation of said eccentric, substantially as described.

23. The combination, with the central vertical shaft and the large gear provided thereon, of means for revolving the same, the pattern-regulator, comprising a sprocket wheel and chain, the shaft whereon said sprocket-wheel is secured, a ratchet-wheel also provided on said shaft, a swinging lever arranged adjacent to said ratchet-wheel and carrying a ratchet-pawl to engage said wheel and said large gear being provided on its under surface with a depending cam to engage the inner end of said swinging lever, substantially as described and for the purpose set forth.

24. In a machine of the class described, the combination, with the cylinder and dial of the upright shaft 16, means for revolving the same, suitable gearing connecting said shaft with said cylinder, the shifter-rod, the vertical lever 171 in engagement therewith, the arm 177 provided upon said shaft 16 and having one end in engagement with said vertical shaft 171 and its opposite end extending toward said cylinder, and the finger 178 provided upon the inner end of said arm 177, for the purpose set forth.

25. In a machine of the class described, the combination, with the dial and cylinder, of the vertical shaft adjacent thereto, means for revolving said shaft, suitable connections between said shaft and said dial and cylinder, whereby the same will be rotated when said shaft is revolved, a shifter-rod, the pivoted lever 171, having one end normally in engagement with said rod, the ring 182 supported beneath said cylinder and provided with a series of teeth, bell-crank levers 185 pivotally supported above said ring and having an arm to project up within said cylinder, an arm 180 carried by said shaft 16 and having one end in engagement with said vertical lever 171 and its opposite end in position to be engaged by the teeth upon said ring 182, for the purpose set forth.

In testimony whereof I have hereunto set my hand this 10th day of July, A. D. 1894.

GEORGE D. MUNSING.

In presence of—
RICHARD PAUL,
M. E. GOOLEY.